(12) United States Patent
Mair

(10) Patent No.: US 9,598,081 B2
(45) Date of Patent: Mar. 21, 2017

(54) METHOD FOR OPERATING A MOTOR VEHICLE WITH A DUAL CLUTCH TRANSMISSION AND CONTROL UNIT FOR CARRYING OUT THE METHOD

(71) Applicant: ZF Friedrichshafen AG, Friedrichshafen (DE)

(72) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/949,926

(22) Filed: Nov. 24, 2015

(65) Prior Publication Data

US 2016/0167658 A1    Jun. 16, 2016

(30) Foreign Application Priority Data

Dec. 11, 2014    (DE) .......................... 10 2014 225 503

(51) Int. Cl.
*G06F 17/00*    (2006.01)
*B60W 30/18*    (2012.01)
(Continued)

(52) U.S. Cl.
CPC ...... *B60W 30/18027* (2013.01); *B60W 10/02* (2013.01); *B60W 10/113* (2013.01); *F16D 48/00* (2013.01); *F16H 59/44* (2013.01); *F16H 61/0246* (2013.01); *F16H 61/688* (2013.01); *B60W 2520/10* (2013.01); *B60W 2710/021* (2013.01); *B60W 2710/1005* (2013.01);
(Continued)

(58) Field of Classification Search
None
See application file for complete search history.

(56) References Cited

U.S. PATENT DOCUMENTS 7,252,621 B2 *    8/2007    Tanba ................ B60W 10/113
477/77
7,302,333 B2    11/2007    Steen et al.

FOREIGN PATENT DOCUMENTS

DE    101 09 662 A1    9/2002
DE    101 28 853 A1    12/2002
(Continued)

OTHER PUBLICATIONS

German Search Report Corresponding to 10 2014 225 474.4 mailed Aug. 7, 2015.

*Primary Examiner* — Dirk Wright
(74) *Attorney, Agent, or Firm* — Davis & Bujold, PLLC; Michael J. Bujold

(57) ABSTRACT

A method of operating a dual-clutch transmission of a vehicle having partial transmissions with respective transmission input shafts. Two friction clutches can couple a corresponding input shaft of the partial transmissions to a drive shaft. Both partial transmissions drive a common output shaft. In a process for starting the motor vehicle, a gear in each of the two partial transmissions is engaged and, if the starting speed of the vehicle in a primary direction is lower than a limit value, the gears in the two partial transmissions are kept engaged. If, however, the starting speed is higher than the limit value, the gear for the travel in an opposite direction in the partial transmission, not involved in the starting process, is disengaged and a follow-up gear, for the gear in the partial transmission involved in the starting process, is engaged.

10 Claims, 1 Drawing Sheet

(51) Int. Cl.
    *B60W 10/02*          (2006.01)
    *B60W 10/113*        (2012.01)
    *F16H 61/688*        (2006.01)
    *F16D 48/00*          (2006.01)
    *F16H 59/44*          (2006.01)
    *F16H 61/02*          (2006.01)

(52) U.S. Cl.
    CPC .... *F16H 2059/443* (2013.01); *F16H 2312/08* (2013.01); *F16H 2312/09* (2013.01)

(56) References Cited

FOREIGN PATENT DOCUMENTS

DE     60 2004 012 248 T2     3/2009
EP         1 266 788 A2    12/2002

\* cited by examiner

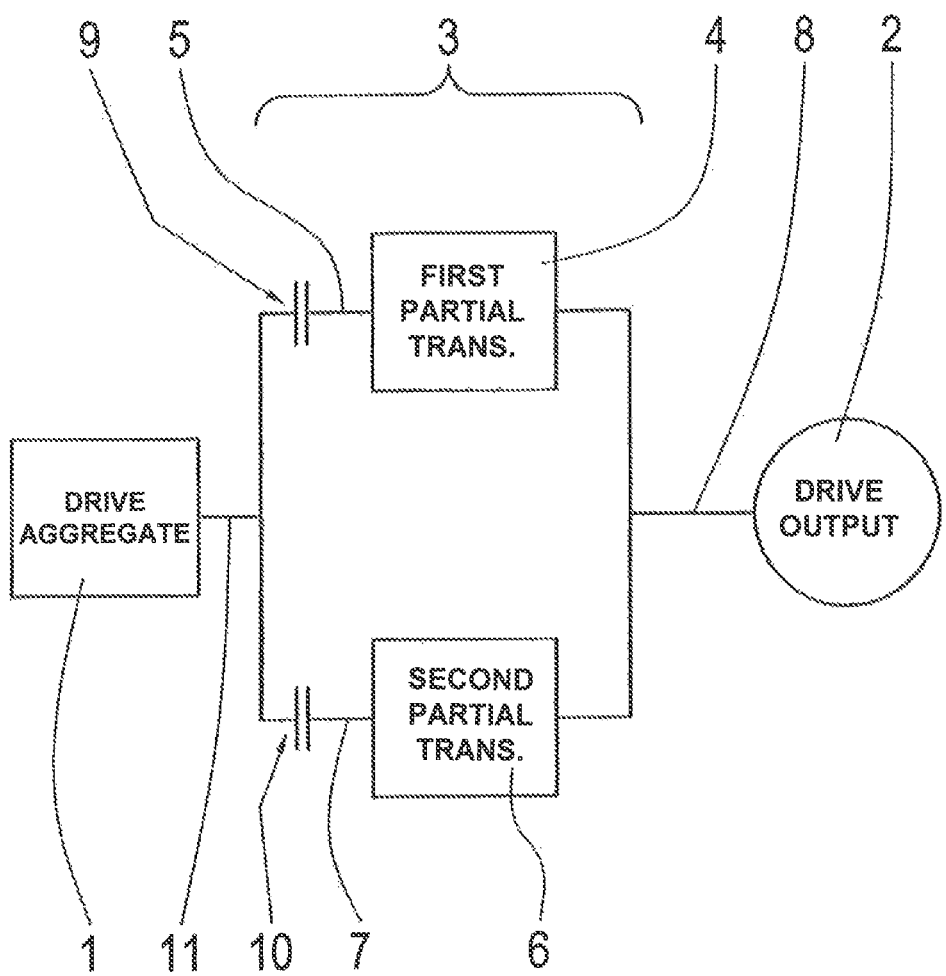

METHOD FOR OPERATING A MOTOR VEHICLE WITH A DUAL CLUTCH TRANSMISSION AND CONTROL UNIT FOR CARRYING OUT THE METHOD

This application claims priority from German patent application serial no. 10 2014 225 503.1 filed Dec. 11, 2014.

FIELD OF THE INVENTION

The invention concerns a method for operating a motor vehicle with a dual-clutch transmission. In addition the invention concerns a control unit for carrying out the method.

BACKGROUND OF THE INVENTION

From DE 101 09 662 B4 a method is known for operating a motor vehicle having a dual-clutch transmission, which serves to enable a quick succession of repeated travel direction changes, for example during a maneuvering or rocking free process. The dual-clutch transmission has two partial transmissions, each partial transmission has a separate transmission input shaft whereas both partial transmissions co-operate with a common transmission output shaft. A first powershiftable friction clutch is associated with a first partial transmission and a second powershiftable friction clutch is associated with a second partial transmission, in such manner that in its closed condition each powershiftable clutch couples the respective transmission input shaft of the partial transmission with which it is associated to a drive input shaft.

To enable repeated direction changes between forward and reverse driving, in DE 101 09 662 B4 it is proposed to keep a forward gear permanently engaged in a first partial transmission and a reverse gear permanently engaged in a second partial transmission, and in order to produce the driving direction changes, opening and closing the two powershiftable clutches in alternation. Such a direction changing mode is either initiated automatically or by the driver's action, while the direction changing mode is terminated depending on a brake pedal actuation and/or an accelerator pedal actuation and/or in a time-controlled manner and/or in a driving distance controlled manner.

SUMMARY OF THE INVENTION

Starting from there, the purpose of the present invention is to provide a new type of method for operating a motor vehicle with a dual-clutch transmission.

In accordance with a first aspect of the invention, this objective is achieved by a method as described below.

According to this, a starting process, when the defined operating situation of the motor vehicle is called for, and when in addition the starting speed of the motor vehicle in a desired starting direction is lower than a limit value, the gears for the opposite travel directions in the two partial transmissions are kept engaged, whereas in contrast, when as the defined operating situation of the motor vehicle a starting process is called for, and when in addition the starting speed of the motor vehicle in the starting direction is higher than the limit value, then in the partial transmission not involved in the starting process the gear for the travel direction opposite to the starting direction is disengaged and a follow-up gear for the gear engaged in the partial transmission involved in the starting process is engaged.

The first aspect of the present invention ensures a particularly advantageous starting process in a motor vehicle with a dual-clutch transmission. For the starting process, in the two partial transmissions of the dual-clutch transmission in each case a gear is engaged, namely gears for alternate, different travel directions. Then, when the starting speed in the starting direction is higher than the limit value, the gear for the travel direction opposite to the starting direction, which is engaged in the partial transmission not involved in the starting process, is disengaged and a follow-up gear for the starting direction is engaged in this partial transmission, which gear is appropriately matched to the gear engaged in the partial transmission involved in the starting process. Thus, when during the starting process the starting speed becomes higher than the limit value, a subsequent travel direction reversal is relatively improbable whereas an upshift, in contrast, is relatively probable, so that in the partial transmission not involved in the starting process the above-described gearshift is carried out. On the other hand, when the starting speed is lower than the limit value, a direction change is quite probable so that the respective gears for the opposite travel directions remain engaged in the two partial transmissions.

In an advantageous further development, when the starting speed is higher than the limit value, the gear for the opposite travel direction is disengaged and the follow-up gear is engaged, in each case, in the partial transmission of the dual-clutch transmission which is not involved in the starting process, in a manner that depends on the acceleration of the motor vehicle.

The acceleration-dependent carrying out of the gearshift in the partial transmission of the dual-clutch transmission not involved in the starting process is particularly preferred, and allows the follow-up gear to be obtained at the right time for an anticipated upshift.

Preferably, when the acceleration of the motor vehicle is higher than a limit value the gear for the opposite travel direction is disengaged immediately and the follow-up gear is engaged immediately, whereas in contrast, if the acceleration of the motor vehicle is lower than a limit value, a condition for the disengagement of the gear for the opposite travel direction and for the subsequent engagement of the follow-up gear is calculated, and when the speed of the motor vehicle becomes higher than a further limit value, the disengagement of the gear for the opposite travel direction and the engagement if the follow-up gear are initiated by the control system. This enables the follow-up gear for the anticipated upshift to be reliably obtained at the correct time, so that the upshift is not affected by any delays.

According to a second aspect of the invention, the objective is achieved by a method further discussed below. According to this, when the defined operating situation of the motor vehicle is that a starting process is required, and if the dual-clutch transmission has several starting gears for a desired starting direction, in one of the partial transmissions a starting gear for the desired starting direction is automatically engaged so that, on the basis of the transmission layout of the dual-clutch transmission, in the respective other partial transmission a gear for the opposite, second travel direction can be engaged, this gear for the opposite, second travel direction being engaged automatically in the other partial transmission.

In this way it is ensured that in the case of a dual-clutch transmission having several starting gears for a desired starting direction, for the starting process gears for opposite travel directions can always be engaged in the two partial transmissions. This is particularly advantageous for utility vehicles, which have several starting forward gears and also several starting reverse gears, in which, however, a gear for the opposite travel direction can be engaged in the respective other partial transmission only for some of these starting gears.

The above two aspects of the invention are preferably used in combination with one another, although they can also be used independently of one another.

The control unit for carrying out the method is also discussed below.

BRIEF DESCRIPTION OF THE DRAWING

Preferred further developments emerge from the description given below. Example embodiments of the invention, to which it is not restricted, are described in more detail with reference to the sole drawing, which shows a drive-train layout of a motor vehicle with a dual-clutch transmission.

DETAILED DESCRIPTION OF THE PREFERRED EMBODIMENTS

The present invention concerns a method for operating a motor vehicle with a dual-clutch transmission and a control unit for carrying out the method.

FIG. 1 shows, very schematically, a drive-train of a motor vehicle; in FIG. 1 a drive aggregate 1, a drive output 2 and a dual-clutch transmission 3 connected between the drive aggregate 1 and the drive output 2 are shown. The dual-clutch transmission 3 has a first partial transmission 4 with a first transmission input shaft 5 and a second partial transmission with a second transmission input shaft 7, such that the two partial transmissions 4, 6 co-operate with a common transmission output shaft 8. Associated with the first partial transmission 4 is a first powershiftable friction clutch 9 and associated with the second partial transmission 6 is a second powershiftable friction clutch 10, such that in its closed condition each of the powershiftable clutches 9 or 10 couples the respective transmission input shaft 5 or 7 of the respective partial transmission 4 or 6 to a drive input shaft 11.

The present invention concerns such details of the operation of a motor vehicle with a dual-clutch transmission 3, which enable particularly advantageous starting of the motor vehicle.

When the motor vehicle is to be started in a desired starting direction, a gear is engaged in each of the two partial transmissions 4, 6 of the dual-clutch transmission 3, namely in one of the partial transmissions a first gear for a first travel direction, namely the desired travel direction, and in the other partial transmission a second gear for a second, opposite starting direction. The powershiftable clutches 9 and 10 are at first both open.

In order, now, to carry out the starting process, one of the powershiftable friction clutches 9 or 10 is then at least partially closed, namely the powershiftable clutch 9 or 10 that co-operates with the partial transmission 4 or 6 in which the gear appropriate for the desired starting direction is engaged. The transmission capacity of this powershiftable clutch is increased until it transmits torque for the starting process.

When, while starting in the desired starting direction, the starting speed of the motor vehicle is lower than a limit value, the gears for the opposite travel directions are kept engaged in both of the two partial transmissions 4, 6. In that case, when after this the driver calls for a travel direction change, the powershiftable clutch 9 or 10 of the partial transmission 4 or 6 of the dual-clutch transmission 3 involved in the starting operation is opened, and the powershiftable clutch 10 or 9 of the partial transmission 6 or 4 of the dual-clutch transmission 3 not involved in the starting operation is closed, so that the travel direction change can be carried out without delay without the need for gearshifts in the partial transmissions 4, 6, for example as soon as the driver correspondingly actuates the accelerator pedal.

To carry out the travel direction change, besides a corresponding command from the driver it can also be necessary for the speed of the motor vehicle to be lower than a limit value or for the motor vehicle to come to a standstill.

The alternate closing and opening of the powershiftable clutch 10 or 9 for the travel direction change can take place sequentially one after the other, or in parallel, with overlap. In the parallel and overlapping control mode of the powershiftable clutches, a still-rolling vehicle can be braked by a bracing torque of the powershiftable clutches and the travel direction changes thereby carried out more rapidly.

When while carrying out the starting process the starting speed in the desired starting direction of the motor vehicle is higher than the limit value, the gear in the partial transmission 6 or 4 not involved in the starting process, for the travel direction opposite to the desired starting direction, is disengaged and in addition, in that partial transmission 6 or 4, a follow-up gear to the gear of the partial transmission 6 or 4 involved in the starting operation, which acts in the desired starting direction, is engaged.

If the starting speed in the desired starting direction is higher than the limit value, the disengagement of the gear for the opposite travel direction and the engagement of the follow-up gear in the partial transmission 6 or 4 of the dual-clutch transmission 3 not involved in the starting operation are preferably carried out in a manner that depends on the acceleration of the motor vehicle.

When during the starting process the acceleration of the motor vehicle is higher than a corresponding limit value, the gear for the opposite travel direction in the partial transmission 6 or 4 that is not involved in the starting process is disengaged immediately, and immediately thereafter the follow-up gear is engaged in that partial transmission, in order to enable an upshift in the desired starting direction to be carried out without delay. In contrast, if the acceleration of the motor vehicle during the starting process is lower than the corresponding limit value, a condition, in particular a shifting time-point is calculated for the disengagement of the gear for the opposite travel direction in the partial transmission 6 or 4 not involved in the starting process and for the subsequent engagement of the follow-up gear that acts in the starting direction in the partial transmission, and if thereafter the speed of the motor vehicle becomes higher than a further limit value, the control system initiates the disengagement of the gear for the opposite travel direction and the engagement of the follow-up gear, both in the partial transmission 6 or 4 not involved in the starting process.

The invention is based on the recognition that when, during starting, the starting speed of the motor vehicle in the desired starting direction is lower than the limit value, the subsequent probability of a travel direction reversal is higher than the probability of a upshift.

In contrast, if during the starting process the starting speed in the desired starting direction is higher than the corresponding limit value, then a subsequent command for a travel direction change is improbable and a command from the control system for an upshift is probable, so in the partial transmission 6 or 4 not involved in the starting process the gear pre-engaged for a travel direction change is then disengaged, and instead, a follow-up gear for the anticipated upshift is engaged.

A shifting time-point for this gearshift in the partial transmission 6 or 4 not involved in starting is preferably determined as a function of the vehicle's acceleration. The higher the vehicle's acceleration, the earlier is the gearshift carried out.

According to a further aspect of the invention, it is provided that when the dual-clutch transmission has several starting gears for a desired starting direction, in particular both several starting forward gears and also several starting reverse gears, in one of the partial transmissions a starting gear for the desired travel direction is engaged automatically, such that on the basis of the transmission layout of the dual-clutch transmission a starting gear for the opposite travel direction can be engaged in the respective other partial transmission. This aspect is particularly important for utility vehicles, which have several and in particular four starting gears for forward driving and several, in particular two starting gears for reverse driving, but in which, by virtue of the transmission layout of the dual-clutch transmission, only for some of these starting gears is it possible to engage a starting gear for the opposite travel direction in the respective other partial transmission. According to this aspect of the invention, therefore, a starting gear for the defined starting direction is automatically engaged in one of the partial transmissions, such that in the other partial transmission a starting gear for the opposite travel direction can be engaged.

Preferably, both aspects of the invention are used in combination with one another in utility vehicles.

The invention also concerns a control unit for carrying out the method. For that purpose the control unit comprises hardware means and software means. As hardware means the control unit comprises data interfaces in order to exchange data with the assemblies involved in carrying out the method according to the invention, as well as a data memory for storing data and a processor for data processing. As software means the control unit contains program modules for carrying out the method according to the invention. The control unit is preferably a transmission control unit.

INDEXES

1 Drive aggregate
2 Drive output
3 Dual-clutch transmission
4 First partial transmission
5 First transmission input shaft
6 Second partial transmission
7 Second transmission input shaft
8 Transmission output shaft
9 First powershiftable clutch
10 Second powershiftable clutch
11 Drive input shaft

The invention claimed is:

1. A method of operating a motor vehicle with a dual-clutch transmission (3) that includes a first partial transmission (4) with a first transmission input shaft (5) and a second partial transmission (6) with a second transmission input shaft (7), the dual-clutch transmission (3) further has a first powershiftable friction clutch (9) associated with the first transmission input shaft (5) which, in its engaged condition, couples the first transmission input shaft (5) and the first partial transmission (4) to a drive input shaft (11), and a second powershiftable friction clutch (10) associated with the second transmission input shaft (7) which, in its engaged condition, couples the second transmission input shaft (7) and the second partial transmission (6) to the drive input shaft (11), and the dual-clutch transmission (3) also has a transmission output shaft (8) common to both the first and the second partial transmissions (4, 6), and, in defined operating situations of the motor vehicle, a gear for a first travel direction is engaged in the first partial transmission (4) and, at the same time, a gear for an opposite, second travel direction is engaged in the second partial transmission (6), the method comprising:

when, as the defined operating situation of the motor vehicle, a starting process is called for, and, if a starting speed of the motor vehicle in a desired starting direction is lower than a limit value, keeping engaged the gears for the opposite, second travel direction in the first and the second partial transmissions (4, 6); and when, as the defined operating situation of the motor vehicle, a starting process is called for, and, if the starting speed of the motor vehicle in the desired starting direction is higher than the limit value, disengaging the gear for the opposite, second travel direction opposite to the desired starting direction in the second partial transmission (4, 6), not involved in the starting process, and engaging a follow-up gear in the second partial transmission which follows the gear in the partial transmission (4, 6) involved in the starting process.

2. The method according to claim 1, further comprising disengaging the first powershiftable clutch (9, 10) of the first partial transmission (4, 6) of the dual-clutch transmission (3) involved in the starting process, and engaging the second powershiftable clutch (9, 10) of the second partial transmission (4, 6) of the dual-clutch transmission (3) not involved in the starting process, when the starting speed of the motor vehicle is lower than the limit value and when a driver subsequently calls for a travel direction change.

3. The method according to claim 1, further comprising, when the starting speed is higher than the limit value, then disengaging, in the second partial transmission (4, 6) of the dual-clutch transmission (3) not involved in the starting process, the gear for the second travel direction opposite to the starting direction, and engaging the follow-up gear for an upshift in the desired starting direction, in a manner that depends on acceleration of the motor vehicle.

4. The method according to claim 3, further comprising, when the acceleration of the motor vehicle is higher than the limit value, immediately disengaging the gear for the opposite second travel direction, and thereafter immediately engaging the follow-up gear.

5. The method according to claim 3, further comprising, when the acceleration of the motor vehicle is lower than the limit value, calculating a condition for the disengagement of the gear for the opposite second travel direction and for subsequent engagement of the follow-up gear, and when the speed of the motor vehicle becomes higher than a further limit value, initiating with a control system the disengagement of the gear for the opposite second travel direction and the engagement of the follow-up gear.

6. The method according to claim 1, further comprising, if the dual-clutch transmission comprises several starting gears for the desired starting direction, automatically engaging, in the first partial transmission, a starting gear for the desired starting direction so that, on a basis of a transmission layout of the dual-clutch transmission (3), the gear for the opposite, second travel direction can be engaged in the second partial transmission, and the gear for the opposite, second travel direction is automatically engaged in the second partial transmission.

7. A method of operating a motor vehicle with a dual-clutch transmission (3) that includes a first partial transmission (4) with a first transmission input shaft (5) and a second partial transmission (6) with a second transmission input shaft (7), the dual-clutch transmission (3) further has a first powershiftable friction clutch (9) associated with the first transmission input shaft (5) which, in its engaged condition, couples the first transmission input shaft (5) and the first partial transmission (4) to a drive input shaft (11), and a second powershiftable friction clutch (10) associated with the second transmission input shaft (7), which in its engaged condition, couples the second transmission input shaft (7) and the second partial transmission (6) to the drive input shaft (11), and the dual-clutch transmission (3) also has a transmission output shaft (8) common to both the first and the second partial transmissions (4, 6), and, in defined operating situations of the motor vehicle, in the first partial transmission (4) a gear for a first travel direction is engaged and, at the same time, in the second partial transmission (6) a gear for an opposite, second travel direction is engaged, the method comprising:

when, as the defined operating situation of the motor vehicle, a starting process is called for and if the dual-clutch transmission (3) comprises several starting gears for starting in a desired starting direction, automatically engaging a starting gear for the desired starting direction in one of the first and the second partial transmissions so that, based on a transmission layout of the dual-clutch transmission (3), a gear for the opposite, second travel direction is engagable in the second partial transmission, and automatically engaging the gear for the opposite, second travel direction.

8. The method according to claim 7, further comprising, if the dual-clutch transmission comprises several starting gears for forward driving and several starting gears for reverse driving in which, however, by virtue of a transmission layout of the dual-clutch transmission, only for some of the starting gears can a gear for the opposite, second travel direction be engaged in the second partial transmission of the dual-clutch transmission, then depending on the desired starting direction and depending on the transmission layout, in one of the first and the second partial transmissions of the dual-clutch transmission, engaging a starting gear for the desired starting direction such that the gear for the opposite, second travel direction is engagable in the second partial transmission.

9. The method according to claim 7, further comprising when, as the defined operating situation of the motor vehicle, the starting process is called for and if a starting speed of the motor vehicle in the desired starting direction is lower than a limit value, maintaining engaged the gears for the opposite, second travel direction in the first and the second partial transmissions (4, 6); and when, as the defined operating situation of the motor vehicle, the starting process is called for and, if the starting speed of the motor vehicle in the desired starting direction is higher than the limit value, disengaging the gear for the opposite, second travel direction opposite to the desired starting direction, in the second partial transmission (4, 6) not involved in the starting process, and engaging a follow-up gear in the second partial transmission which follows the gear in the partial transmission (4, 6) involved in the starting process.

10. A control unit of a dual-clutch transmission for a motor vehicle which is operated by a defined method, the dual-clutch transmission comprises a first partial transmission (4) with a first transmission input shaft (5) and a second partial transmission (6) with a second transmission input shaft (7), the dual-clutch transmission (3) further having a first powershiftable friction clutch (9) associated with the first transmission input shaft (5) which, in an engaged condition, couples the first transmission input shaft (5) and the first partial transmission (4) to a drive input shaft (11), and a second powershiftable friction clutch (10) associated with the second transmission input shaft (7) which, in an engaged condition, couples the second transmission input shaft (7) and the second partial transmission (6) to the drive input shaft (11), and the dual-clutch transmission (3) also having a transmission output shaft (8) common to both the first and the second partial transmissions (4, 6), and, in defined operating situations of the motor vehicle, a gear for a first travel direction is engaged in the first partial transmission (4) and, at the same time, a gear for an opposite, second travel direction is engaged in the second partial transmission (6), the defined method comprising:

when, as one of the defined operating situations of the motor vehicle, a starting process is called for, and, if a starting speed of the motor vehicle, in a desired starting direction, is lower than a limit value, maintaining engaged the gears for the opposite, second travel direction in the first and the second partial transmissions (4, 6); and when, as the defined operating situation of the motor vehicle, a starting process is called for, and, if the starting speed of the motor vehicle in the desired starting direction is higher than the limit value, disengaging the gear for the opposite, second travel direction opposite to the desired starting direction, in the second partial transmission (4, 6) not involved in the starting process, and engaging a follow-up gear in the second partial transmission which follows the gear in the partial transmission (4, 6) involved in the starting process.

* * * * *